US006787084B1

(12) United States Patent
Orlandi

(10) Patent No.: US 6,787,084 B1
(45) Date of Patent: Sep. 7, 2004

(54) PROCEDURE FOR MANUFACTURING SPECIAL CHAMFERED TILE

(75) Inventor: Paolo Orlandi, Serramazzoni (IT)

(73) Assignee: Casa Tile S.R.L., Modena (IT)

( * ) Notice: Subject to any disclaimer, the term of this patent is extended or adjusted under 35 U.S.C. 154(b) by 293 days.

(21) Appl. No.: 09/666,266

(22) Filed: Sep. 21, 2000

Related U.S. Application Data

(63) Continuation of application No. PCT/EP99/01649, filed on Mar. 12, 1999.

(30) Foreign Application Priority Data

Mar. 24, 1998 (IT) ....................................... MO98A0064

(51) Int. Cl.[7] .......................... B29C 59/00; B29C 37/02
(52) U.S. Cl. ....................................... 264/129; 264/138
(58) Field of Search ................................. 264/129, 138

(56) References Cited

U.S. PATENT DOCUMENTS 4,790,110 A * 12/1988 Bard ........................ 52/173 R
5,082,355 A * 1/1992 Warszawski ................ 359/265
6,020,028 A * 2/2000 Kinneberg
6,152,127 A * 11/2000 Fuhrman et al. .............. 125/35
6,354,058 B1 * 3/2002 Lewis ..................... 52/749.11

* cited by examiner

*Primary Examiner*—Christopher A. Fiorilla
(74) *Attorney, Agent, or Firm*—Thomas R. Vigil; Welsh & Katz, Ltd.

(57) ABSTRACT

A special tile (1) is created from a basic standard tile and includes a front surface (3) with the decoration and finish determined in the basic tile manufacturer's plant. At least one edge (**5*a*, 5*b*) is chamfered, bevelled or rounded in order to define a worked profile, preferablyh with a "bird's beak (4)". The work profile (4) is painted cold with, for example, a double component or solvent based painting product, to obtain a finish which is generally similar to or co-ordinated with the finish and decoration of the front surface. The painting is preferably carried out by means of an apparatus with a manual airbrush, which is preceded by the application of a primer which acts as a fixative. After the application of the primer and the painting product, the special tile (1)** is kept in a resting position for a pre-determined period of time in an environment with a controlled temperature or it is brought up to tone using a pigmented primer.

6 Claims, 1 Drawing Sheet

PROCEDURE FOR MANUFACTURING SPECIAL CHAMFERED TILE

Figure 1:
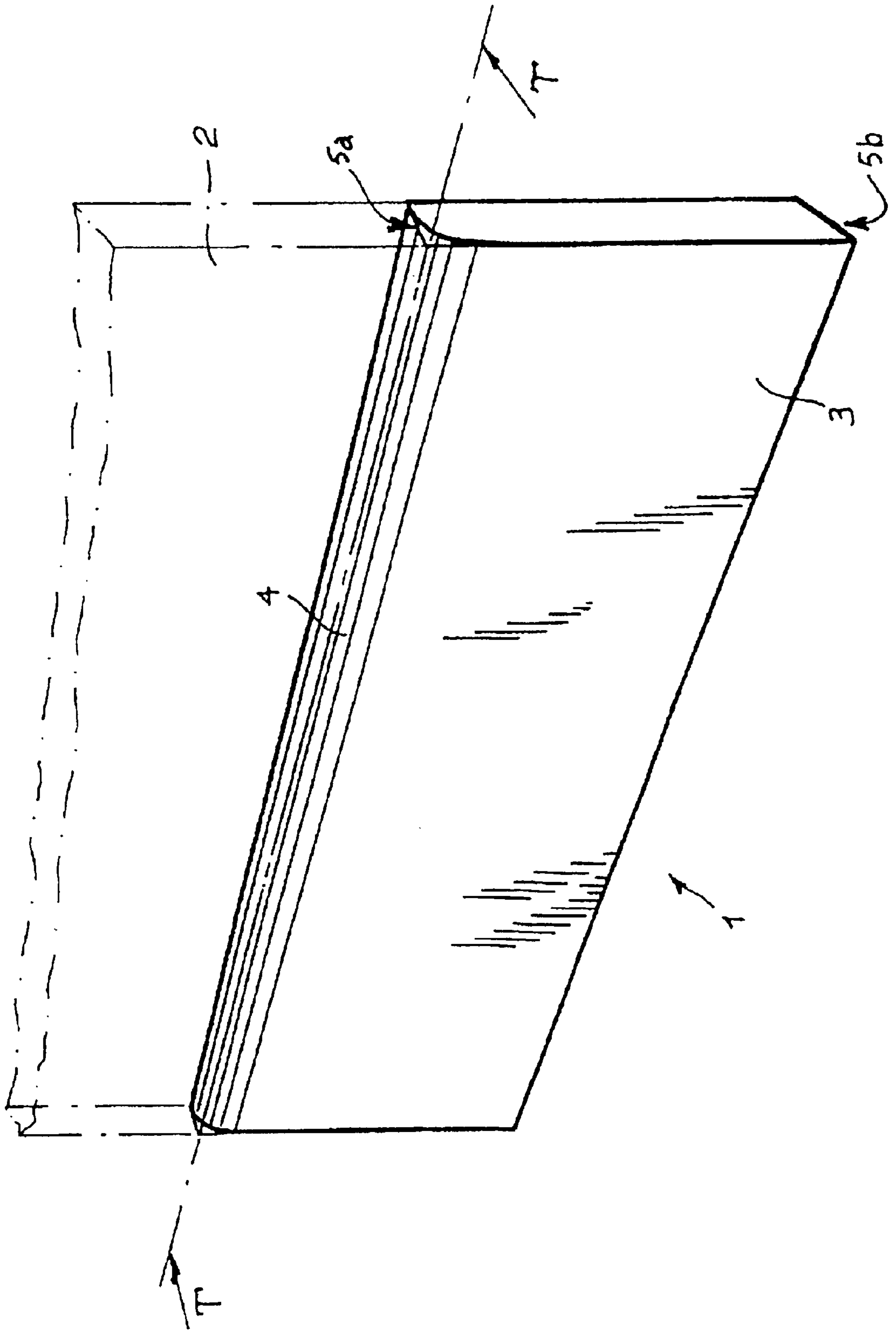

This application is a continuing PCT EP/99/01649, filed Mar. 12, 1999.

TECHNICAL FIELD

The present invention relates to a special chamfered tile and the procedure for its manufacture.

The manufacture of stoneware and ceramic floor and wall tiles is normally carried out by highly automated systems which are capable of producing large numbers of tiles of the same type. Since a change in format, design and/or decoration of the tiles being produced involves stopping the system and modifying parts of the equipment, the production line is generally avoided for trim pieces like, for example, the rectangular tiles used when laying frames and skirting which match the floor or wall tiles.

BACKGROUND ART

It is known that the aforementioned articles are manufactured by means of the mechanical cutting and working of standard wall and floor tiles. For example, the standard tiles of a square type are cut to form rectangular or chamfered trim pieces or those which have at least one rounded edge to form the so-called "bird's beak" which, once the piece is laid, constitutes the visible edge of a frame or skirting which matches the floor or wall made of standard tiles.

Naturally, the mechanical working of the standard tiles to produce trim pieces, i.e. the cutting and the subsequent bevelling or rounding, exposes, in the area worked on, the substratum of the tile itself, which could be single fired, porcelain stoneware, double fired, porous single fired, or manufactured using other commonly known materials from the sector. Given that aesthetic appearance is an important aspect of this specific sector it therefore appears necessary to treat the area to be worked on to provide it with the finishing features which are comparable to those of the standard tiles from which they originate. The commonly known treatments envisage the glazing of the area worked on with ceramic glazes and the subsequent firing of the trim pieces according to the methods adopted for the manufacturing of the basic standard tiles.

However, the said commonly known procedure has various drawbacks, the first being the high production costs which are due to the time needed for the firing of trim pieces. Another drawback comes from the fact that the firing of trim pieces in kilns can cause alterations in the tones and/or the geometry which are unacceptable and may also cause cracks and breakages and therefore working scraps.

DISCLOSURE OF INVENTION

According to the present invention there is provided a procedure for the manufacture of a special file, and a tile formed by the procedure and manufactured from a basic tile which is single fired, porcelain stoneware, double fired, porous single fired or manufactured using other commonly known materials from the sector, comprising both a first phase for cutting of the basic tile according to a cutting plan and transverse to a decorated front surface and a second phase for chamfering, beveling or rounding of at least one edge of the the special tile to form a profile with a desired shape, further comprising the following two phases: an application, to the area of the worked profile, by means of a painting apparatus, of a cold painting product which acts as a superficial or decorative finish, the application being made by means of a painting apparatus: the application of the cold painting product being suitable to avoid the necessity of a second firing which may often cause cracks and breakages in the special tiles and therefore working scraps: and, a drying of the the painting product with a controlled temperature after its application: the painting product being suitable for the restoration of the original aesthetic appearance of the the special tile in the same area of which have been executed the the phase of chamfering, beveling or rounding: and wherein after the chamfering, beveling or rounding phase and before the application of the cold painting product, two further intermediary phases are performed, namely, an application to the area of worked profile of a neutral epoxidic pigmented primer which acts as fixative, the application being made by means of a painting apparatus: and leaving the special tile to rest in an environment with a controlled temperature before the application of the cold painting produce.

Further characteristics and advantages of the present invention will better emerge from the detailed description of a preferred embodiment that follows, in the form of a non limiting example, with particular reference to the FIGURE enclosed, in which:

the FIGURE is a perspective view of a special chamfered tile according to the invention.

With particular reference to the FIGURE mentioned, a special tile 1 is produced, preferably by cutting transversally, according to the cutting plan, a basic floor or wall tile 2, as indicated by the arrows T—T. The special tile 1 therefore also includes a front surface 3 decorated with the same motive as the basic tile 2. At least one of the long edges 5*a*, 5*b* of the special tile 1 is chamfered, bevelled or rounded to form the so-called 'bird's beak' 4 which, once the special tiles 1 are laid, remains in view.

The 'bird's beak' 4 is subsequently painted cold with a double component polyurethane paint to obtain a surface finish which is generally similar to or coordinated with the finishing and decoration of the front surface 3. In addition to or as an alternative to the aforementioned glaze, the tile can be brought to the correct tone using pigmented primers, for example, those which are solvent based.

The finishing process for the bird's beak profile 4 should preferably include the following phases:

- a neutral epoxidic primer which acts as a fixative is applied by means of a commonly-known painting apparatus, such as an airbrush, in particular, but not limited to, a manual one;
- the special tile is then left for a pre-determined period, for example 24 hours, at room temperature or in a controlled environment at 20° C. a few hours, preferably two:
- a double component polyurethane painting product, which acts as a decorative surface finish, is then applied by means of a commonly known painting apparatus, such as an airbrush, in particular, but not limited to, a manual one;
- the special tile is dried for a pre-determined period of time, preferably in a controlled environment at 20° C. for approximately two hours;
- the special tile is packed; the special tile production line can be at least partially automated and includes, in order: a cutting station for the basic tile;
- a chamfering station for at least one of the special tile's edges; a station for the first application of the primer which acts as a fixative, including, for example, an apparatus with a manual airbrush;

a rest station with a ventilated compenser where the tile is left at approximately 20° C. for approximately two hours;

a second station, including another apparatus with a manual airbrush, for the application of the surface finish, in particular the double component polyurethane paint;

a drying station with a second ventilated compenser where the tile is left at approximately 20° C. for approximately two hours;

a packing station.

With the procedure according to the present invention it is possible to reduce production times for basic tiles and coordinated special tiles dramatically, with a subsequent reduction in production costs.

Furthermore, the application of a painting product which is generally applied cold, prevents the morphological features, with regards the colour tones and the geometry of the tile's substratum, being altered, in this way guaranteeing a high quality finished product and a dramatic reduction in waste pieces.

In some particular cases, depending on the type of substratum of the basic tile, the intended use of the special tile and the features of the glazing product, it is even possible to avoid the primer application phase and the special tile's consequent intermediary resting phase, in this way reducing the production times and costs still further.

Obviously, by maintaining the principle of the present invention, various embodiments are possible and the relevant details can be varied widely with respect to this description and its illustration without falling outside the field of the present invention.

What is claimed is:

1. A procedure for the manufacture of a special tile from a basic tile which is single fired, porcelain stoneware, double fired, porous single fired or manufactured using other commonly known materials from the sector, comprising both a first phase for cutting of the basic tile according to a cutting plan and transverse to a decorated front surface and a second phase for chamfering, beveling or rounding of at least one edge of the said special tile to form a profile with a desired shape, further comprising the following two phases: an application, to the area of the worked profile, by means of a painting apparatus, of a cold painting product which acts as a superficial or decorative finish, said application being made by means of a painting apparatus; said application of the cold painting product being suitable to avoid the necessity of a second firing which may often cause cracks and breakages in the special tiles and therefore working scraps; and, a drying of the said painting product with a controlled temperature after its application; said painting product being suitable for the restoration of the original aesthetic appearance of the said special tile in the same area of which have been executed the said phase of chamfering, beveling or rounding: and.

wherein after the chamfering, beveling or rounding phase and before the application of the cold painting product, two further intermediary phases are peformed, namely, an application to the area of worked profile of a neutral epoxidic pigmented primer which acts as fixative, said application being made by means of a painting apparatus: and.

leaving the special tile to rest in an environment with a controlled temperature before the application of the cold painting product.

2. A procedure as in claim 1, wherein the drying phase takes place in a controlled environment at 20° C. for a period of approximately two hours.

3. A procedure as in claim 1, wherein the painting apparatus includes a manual airbrush.

4. A procedure as in claim 1, wherein the cold painting product includes a double component polyurethane product.

5. A procedure as in claim 1, wherein the resting phase takes place in a controlled environment at 20° C. for a period of approximately two hours.

6. A procedure as in claim 1, wherein the application, to the area of the worked profile, by means of a painting apparatus, of a cold painting product which acts as a superficial or decorative finish includes cold painting a "bird's beak", to obtain a surface finish which is generally similar to or coordinated with the decoration on the decorated front surface.

* * * * *